Figure 2:
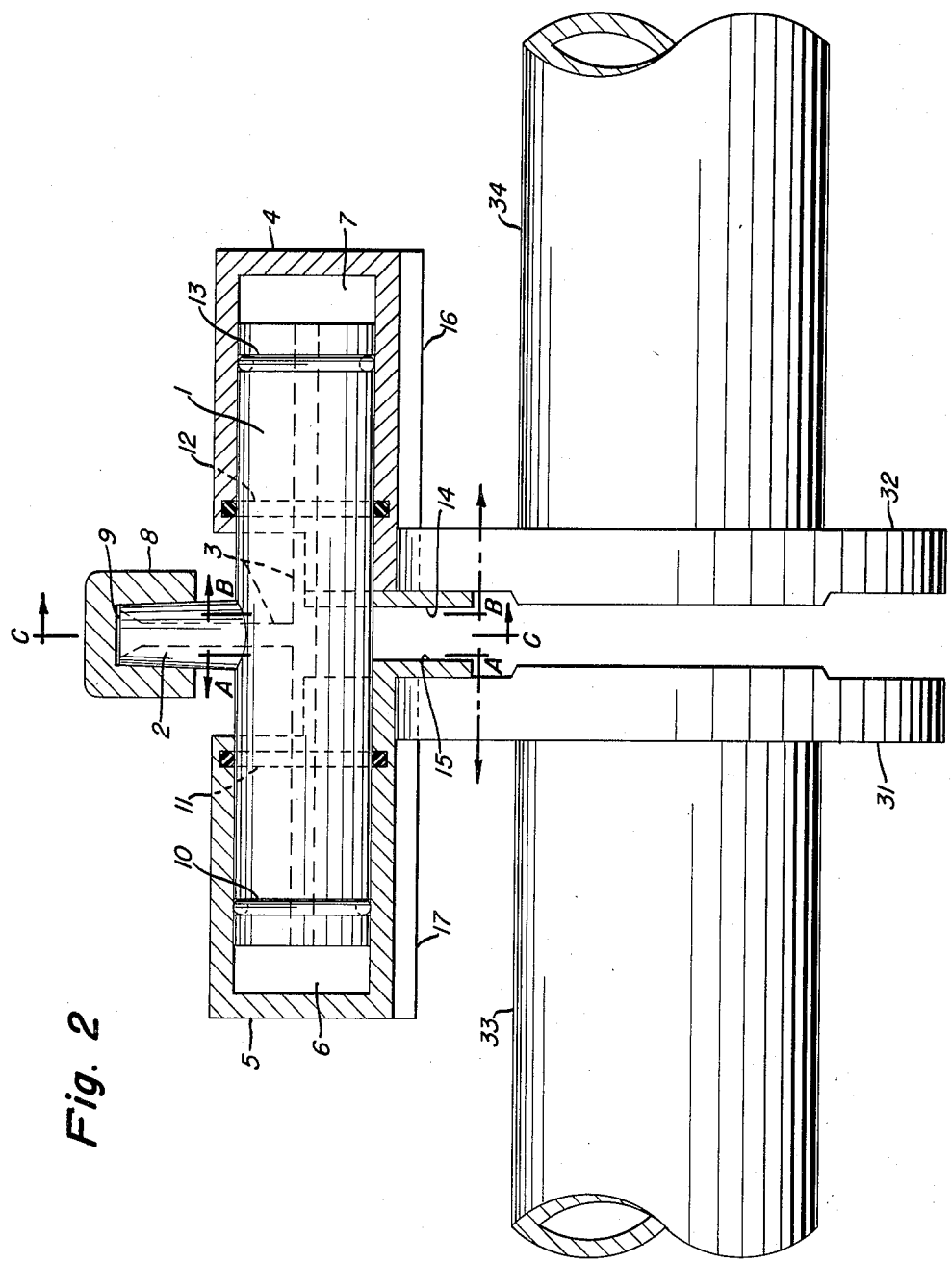
Figure 4:
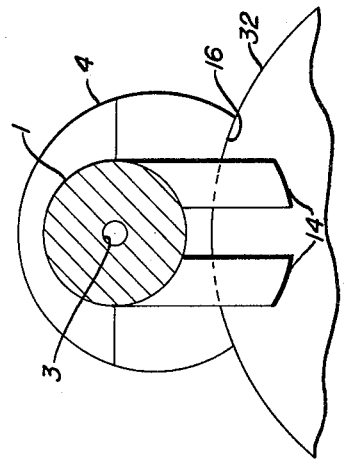
Figure 5:
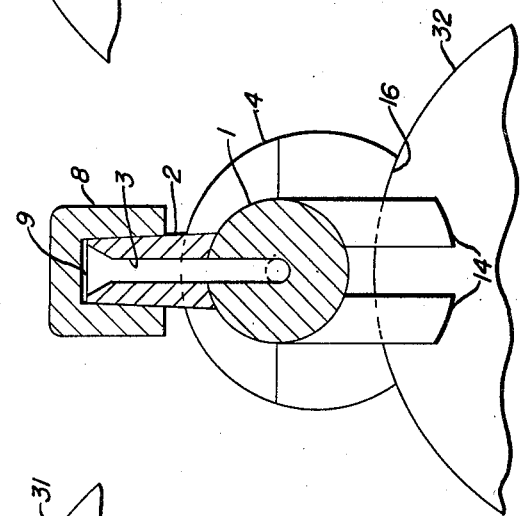

Oct. 22, 1963
C. G. SANDIFER
3,107,419
FLANGE SPREADER
Filed July 13, 1959
4 Sheets-Sheet 1
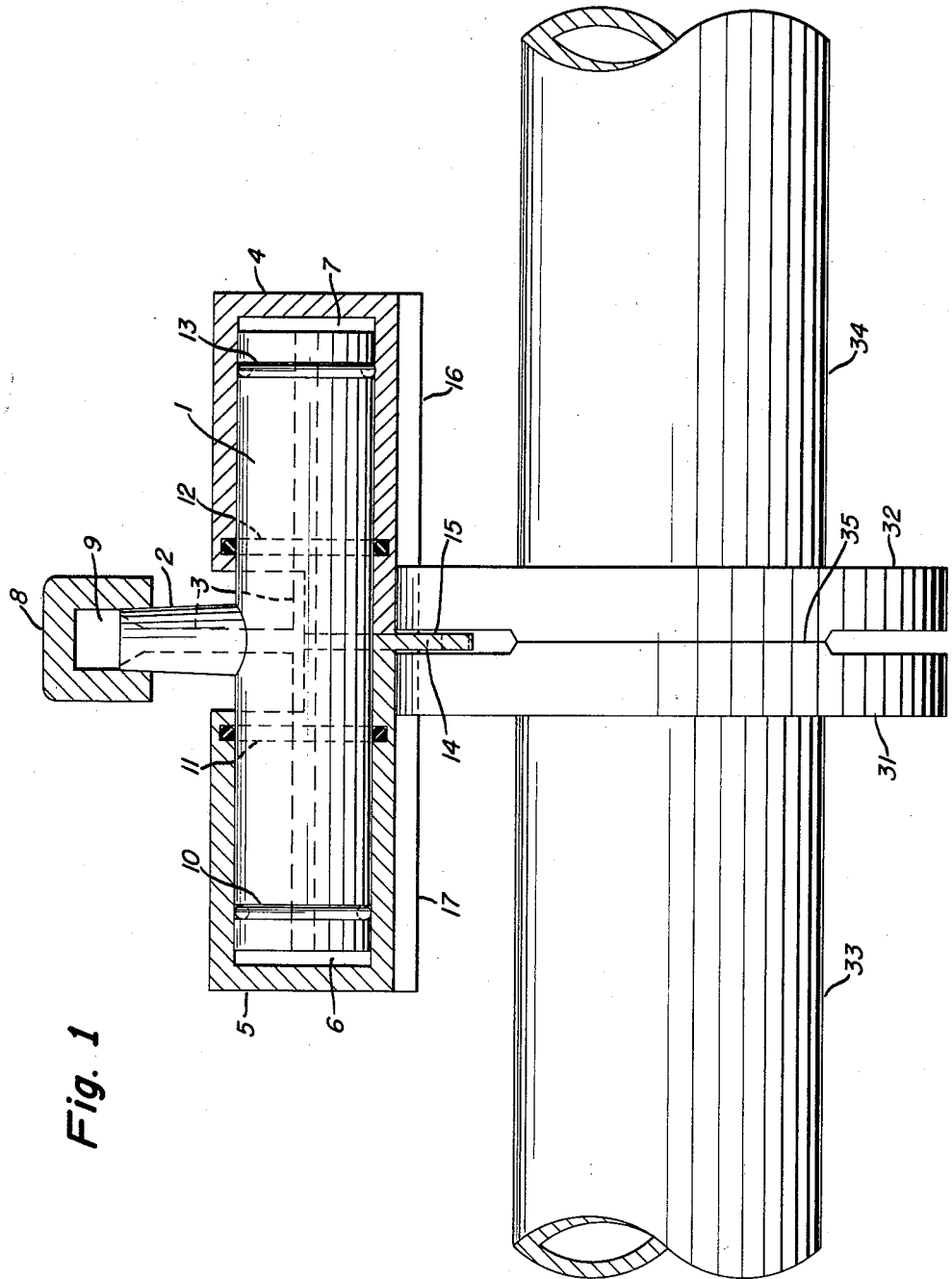
Fig. 1
INVENTOR.
Connard G. Sandifer
BY 
ATTORNEY Oct. 22, 1963 C. G. SANDIFER 3,107,419
FLANGE SPREADER
Filed July 13, 1959 4 Sheets-Sheet 2

INVENTOR.
Connard G. Sandifer
BY
ATTORNEY

Oct. 22, 1963　　　C. G. SANDIFER　　　3,107,419
FLANGE SPREADER

Filed July 13, 1959　　　　　　　　　　4 Sheets-Sheet 3

INVENTOR.
Connard G. Sandifer
BY
ATTORNEY

Oct. 22, 1963     C. G. SANDIFER     3,107,419
FLANGE SPREADER

Filed July 13, 1959     4 Sheets-Sheet 4

INVENTOR.
Connard G. Sandifer
BY
ATTORNEY 3,107,419
FLANGE SPREADER
Connard G. Sandifer, P.O. Box 911, Lake Arthur, La.
Filed July 13, 1959, Ser. No. 826,514
5 Claims. (Cl. 29—239)

This invention relates to a device for spreading flanges. The invention further relates to a structurally balanced flange spreader employing a hydraulic system for forcing apart flanged rings and particularly ring-type flanged joints.

It is often necessary to separate two pieces of flanged metal in order to gain access to an area made inaccessible by the flanged metal. For example, in order to change orifice plates and gaskets in ring-type flanged joints, it is necessary to separate the flanged rings which are normally bolted together to hold the joints together. Separation of the flanged rings serves to separate the joint for access to the orifice plate or gasket. The flanged joints are held together normally by bolts through flanges at the joint with such force so as to cause the joint to stick making separation of the joint difficult. Further, additional forces are exerted by the pipes themselves at the flanged joint which pipes are normally attached to other pipes, reactors, vessels, etc. and thereby exert forces on and tend to hold the joint closed. These additional forces increase the difficulty in separating the joint. Thus when it is necessary to separate such a joint, often both the force of the sticking joint and the force of the mounted pipes must be overcome. Hydraulically actuated flange separators have been developed to separate flanges; however such flange separators which exert sufficient force to initially break the strongly adhering joints and further force the pipes apart are generally either too bulky to move to relatively inaccessible positions, such as exist in refineries, or else generally require extraneous expensive hydraulic equipment and long hydraulic lines for operation in relatively inaccessible positions. Further, such flange separators are often difficult to position at the flanged joint and tend to become disassociated from the joint before it is possible to hold them into position by gripping action on the flanges.

I have provided a flange separator which is portable and suitable for use in relatively inaccessible positions such as in a refinery. The flange spreader of this invention is hydraulically operated and functions to separate flanges by a two directional application of hydraulic fluid which is forced in two opposing streams to move two opposing flange grippers in opposite directions, thereby separating the flanged joint. Further, I have provided a flange spreader which is structurally balanced and may be easily positioned upon a flanged joint and maintained in place without the necessity of a gripping action on the flanges of the joint. In addition, my invention provides a flange spreader which may be operated by a hammering action, such as may be delivered by hand with a sledge hammer, and does not require pressure lines for use in less accessible applications.

The hydraulic flange spreader of this invention employs two opposing cylinders each having one closed end, which cylinders are positioned on opposite ends of a piston. Within the piston there is provided a hydraulic fluid conduit which communicates with both ends of the piston and also communicates with a hydraulic force supplying inlet. Attached to the two cylinders are projections which are capable of insertion between the flanges of a flanged joint in such a manner that a projection from each cylinder may be positioned between the flanges. In operation, force is applied at the inlet to the conduit and is transmitted by the hydraulic fluid to the closed ends of the two cylinders so that the two cylinders are forced in opposite directions carrying the projections between the flanges with them. The force of the projections upon the flanges causes the flanges and joints to separate. The force applied to the hydraulic fluid at the inlet is preferably applied by means of a hammerable cap. The hammerable cap may be a cap slidably affixed upon a second piston, which second piston is attached in a position perpendicular to the piston on which the cylinders are mounted. Hammering blows upon the cap exert a force upon the hydraulic fluid within the conduit or reservoir. This force causes separation of the flanges as described above.

FIGURE I illustrates one embodiment of this invention. In FIGURE I the flange separating device is illustrated positioned at a flanged joint before separation of the flanges.

FIGURE II illustrates the embodiment of FIGURE I after separation of the flanges.

FIGURE III represents a cross-section of one slidable cylinder at line A—A of FIGURE II.

FIGURE IV represents a cross-section of the second slidable cylinder at line B—B of FIGURE II.

FIGURE V illustrates a cross-section of the main piston upon which the cylinders are mounted, along line C—C of FIGURE II.

FIGURE VI illustrates another embodiment of the invention employing a cap capable of utilizing extraneous hydraulic force means.

FIGURE VII illustrates another embodiment of the cap.

With reference to the embodiment of FIGURE I, main piston 1 is provided with an inlet piston 2 positioned substantially at right angles to piston 1 and affixed thereto. Conduit 3 is provided within piston 1 and inlet piston 2. Conduit 3 extends outwardly from the ends of piston 1 and the unattached end of inlet piston 2. Cylinders 4 and 5 are slidably mounted on opposite ends of piston 1 and may advantageously be so adjusted as to leave chambers 6 and 7 between the closed ends of cylinders 4 and 5 and the ends of piston 1. Chambers 6 and 7 are advantageous to assure even distribution of hydraulic fluid over the interior surfaces of the ends of cylinders 4 and 5 so that force transmitted through the fluid will not be concentrated initially over only a very small area of the interior surfaces of the cylinders. Cap 8 is slidably mounted on inlet piston 2 so as to provide hydraulic fluid chamber 9 under cap 8. Cap 8 is force fitted on inlet piston 2 so as to prevent movement of cap 8 away from the axis of piston 1 or "backing-off" the pressure when back pressure is exerted on the interior of cap 8 within chamber 9. Other means for avoiding backing-off the pressure within chamber 9 may be used; thus, cap 8 may be mounted at inlet piston 2 through ratchet means by keys or other projections protruding inwardly from the lip of cap 8 in key ways or other slits in the exterior surface of inlet piston 2, or through other means for preventing cap 8 from moving away from the axis of main piston 1 without preventing the movement of cap 8 toward the axis of main piston 1.

Cap 8, cylinders 4 and 5, main piston 1 and inlet piston 2 essentially confine a single hydraulic fluid body, consisting essentially of a hydraulic fluid, within hydraulic fluid chamber 9, conduit 3 and chambers 6 and 7. The hydraulic fluid transmits forces or pressures exerted within hydraulic fluid chamber 9 through conduit 3 to opposing chambers 6 and 7. The hydraulic fluid of the single hydraulic fluid body is fluid in nature and must be substantially non-compressible. Such hydraulic fluids are well known to the art and may be obtained from a number of sources under a number of trade-names.

Main piston 1 is provided with O-rings 10 and 13 and cylinders 4 and 5 are provided with O-rings 11 and 12 to prevent the escape of hydraulic fluid from chambers 6 and 7. Cylinders 4 and 5 are further provided with flange gripping projections 14 and 15 which are of such size and shape as to be readily insertable between the flange joint flanges. The projections 14 and 15 should be of steel or other material which will not unduly distort or fracture under stress. In addition cylinders 4 and 5 may be provided with concave surfaces 16 and 17 to improve the ability of the flange spreader to remain in position upon the flanged pipe joint.

In operation the flange gripping projections 14 and 15 are inserted between flanges 31 and 32 on pipes 33 and 34 joined at joint 35. Hammer action upon cap 8 acts upon the fluid in chamber 9 and conduits 3 so as to force cylinders 4 and 5 outwardly from the ends of piston 1, thereby exerting force in opposing directions and opening joint 35. Backing-off the pressure after each hammer blow is avoided by the force fitting of cap 8 on inlet piston 2.

FIGURE II illustrates the embodiment of FIGURE I with the cylinders in extended position, having opened the flanged joint. Cap 8 has been driven toward the axis of piston 1 so as to force the hydraulic fluid in conduit 2 from the ends of piston 1, thereby enlarging chambers 7 and 8 and forcing the two cylinders 4 and 5 apart. The size of chamber 9 has correspondingly been diminished in substantially the same amount as the total volumes of chambers 7 and 8 have been increased. Projections 14 and 15, carried by cylinders 4 and 5 respectively, have been drawn apart by the travel of cylinders 4 and 5 in opposite directions. The projections are in gripping contact with flanges 31 and 32 holding the flanges, the broken joint between pipes 33 and 34 and the pipes themselves apart.

FIGURE III illustrates the cross-section view of cylinder 5 at line A—A of FIGURE II. Cylinder 5 is attached to projection 15 and surface 17 is concave in order to better enable cylinder 5 to be positioned upon a flange ring or pipe.

Figure 3:
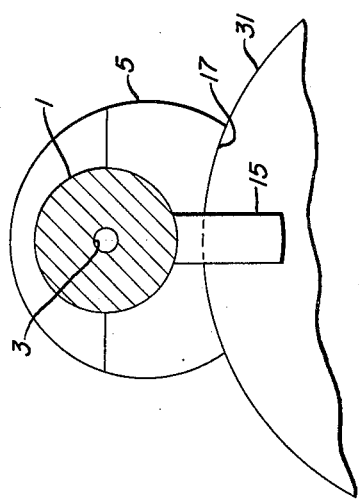
Figure 7:
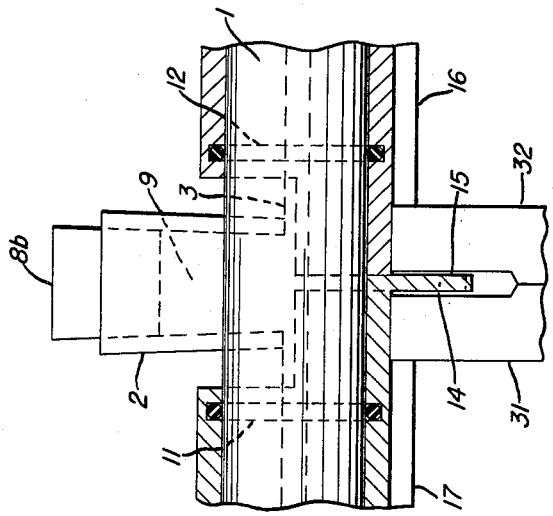
Figure 6:
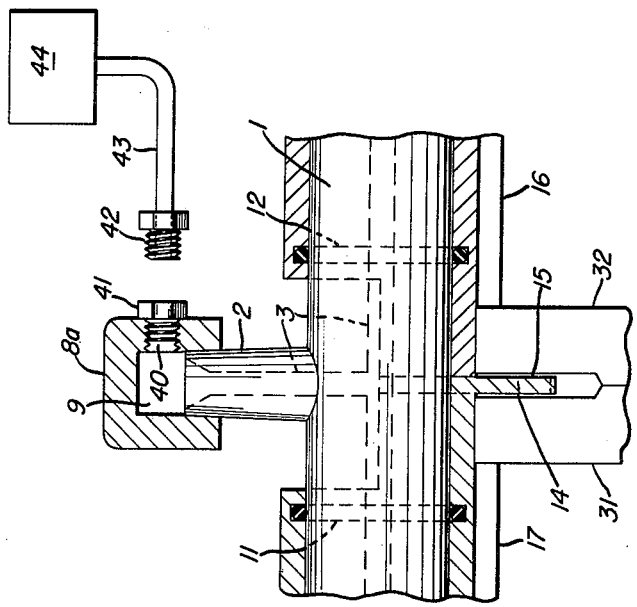

FIGURE IV shows the cross-sectional view of cylinder 4 along line B—B of FIGURE II. Projection 14 is so configurated so as to be capable of adjacent positioning with regard to projection 15 of cylinder 5 in FIGURE 3. Surface 16 is also concave to allow better positioning of cylinder 4 upon a flanged ring or pipe.

Projections 14 and 15 as illustrated in FIGURES I through IV are elongated projections and are positionable adjacent to each other in order to allow their insertion between flange rings. The projections may be of the same or different configurations. When projections are of the same configuration they should be positionable substantially in a back-to-back order and each should be of a thickness which is less than half the distance between ring flanges to be separated. More advantageously, the projections should be of a different configuration so that they may be of increased thickness. The different configurations of projections should be such as to allow the projections to be positioned in adjacent relation to each other and in slidable relation to each other with regard to the relative directions of movement of the respective cylinders upon which each is mounted and by which each is carried.

FIGURE V of the drawings shows a cross-sectional view at line C—C of FIGURE II and is particularly illustrative of piston 1 upon which the cylinders are slidable in opposite directions. FIGURE V illustrates the position of conduit 3 within main piston 1 and inlet piston 2. The illustration of FIGURE V further shows a cross sectional view of cap 8 and hydraulic fluid chamber 9.

FIGURE VI illustrates an adaptation of the basic embodiment shown by FIGURES I and II. In the adaptation of FIGURE VI, cap 8a is provided with opening 40 and pressure sealing plug 41 which may be received by opening 40. Plug 41 is illustrated as being threaded and as being received by threaded opening 40; however the plug may be fittable into opening 40 by other means such as spline and key way, tapered configuration, etc., so as to provide a pressure sealed plug in opening 40. In the embodiment of FIGURE VI cap 8a may be hammered downward to separate flange rings as set out hereinabove. Alternatively, plug 41 may be removed and fitting 42 may be inserted into opening 40 in pressure sealed relation with opening 40 and hydraulic pressure means 44 may be actuated to exert hydraulic force within chamber 9 through tubing 43, fitting 42 and opening 40, thereby causing separation of flanges as hereinabove described.

FIGURE VII illustrates another embodiment of this invention wherein cap 8b is of the configuration of a piston and is driven into chamber 9 within main piston 1. Cap 8b is slidably positionable in chamber 9 in pressure sealing relation with the walls of chamber 9 so that as cap 8b is driven toward the axis of main piston 1, the volume of chamber 9 is decreased and the ring flanges are separated as hereinabove set out.

The flange gripping projections useable in the device of this invention may be of the configuration of any flange grippers known to the art. The projections may be simply flat projections outwardly from the cylinders. They may have plane flat gripping surfaces, or if desired, they may be provided with more flange gripping surfaces, or the like.

The cap by means of which force may be exerted within the hydraulic fluid chamber, may be simply a tube or fitting attached to the inlet of the hydraulic fluid conduit through which pressure or force may be applied. The cap may be simply an internal or externally threaded cap threaded in or on an externally or internally threaded hydraulic fluid chamber or conduit wall in pressure sealing relation. The cap should be provided with means to inhibit it against outward movement as hereinabove set out. The preferred cap means is the inverted cup shaped cap which is force fitted on and slidably positioned over an inlet piston containing the hydraulic fluid chamber such as, for example, the cap illustrated in FIGURES I and II.

After the flanges of a flanged joint have been separated as hereinabove set out and it is again desired to reform the joint, the hydraulic fluid confining effect of the cap is relieved or removed. This may be conveniently done by removing the cap, such as with a pry bar, hammering action away from the axis of the main piston, a wrench for unscrewing a threaded cap, means for removing or reducing an extraneous pressure source, depending upon the configuration of the particular cap employed. In the preferred cup shaped cap arrangement described hereinabove, the cap may readily be removed with a pry bar under the lip of the cap or by hammering the cap away from the axis of the main piston or by other means which will be obvious to those skilled in the art. In the embodiment of FIGURE VI, plug 41 or fitting 42 can be removed or loosened to eliminate the pressurizing effect. Upon removing the pressurizing effect of the cap, the flanges are allowed to return substantially to their original position and may be bolted into place to reform the joint.

It is evident from the above that I have provided a flange spreader device which utilizes two-directional hydraulic pressure between a pair of opposed flanged grippers for separating flanged joints.

I claim:

1. A hydraulic flange spreader which comprises a piston having two opposite ends, two opposing cylinders each having one closed end and each being slidably positioned on said opposite ends of said piston in pressure sealed relation with said piston, a flange gripper attached to each said cylinder at its open end, a pressurizable chamber formed by said opposing cylinders and said piston and communicating through said piston, a fluid within said chamber, said fluid being in contact with said opposing cylinders and said opposite ends of said piston, and cap means carried by said piston between said two opposing cylinders, said chamber being pressurizable by said cap means.

2. A hydraulic flange spreader which comprises a piston having two ends, a first cylinder having one closed end and slidably positioned over the first end of said piston substantially in pressure sealed relation with said piston, a second opposing cylinder having one closed end and slidably positioned over the second end of said piston substantially in pressure sealed relation with said piston, a pressurizable conduit within said piston and communicating externally from said piston through a first outlet through the first end of said piston,, a second outlet through the second end of said piston, pressurizable chambers within said cylinders at each end of said piston connecting with said pressurizable conduit, an inlet through the wall of said piston essentially between said first cylinder and said second cylinder, a first flange spreader projection attached to said first cylinder at the open end of said first cylinder and extending outwardly from said first cylinder, a second projection attached to said second cylinder at the open end of said second cylinder and extending outwardly from said second cylinder, said first and second projections being carried by said first and second cylinders and being capable of movement to and from a position of adjacent relation with each other, and slideably hammerable cap means slideably mounted at said inlet for pressurizing said pressurizable conduit through said inlet whereby pressure applied to the ends of said piston and the interiors of said cylinders through said pressurizable conduit and pressurizable chambers causes said projections carried by said cylinders to move in opposite directions.

3. The hydraulic flange spreader of claim 1 wherein said cap means is a hammerable plug positioned within said inlet means.

4. The hydraulic flange spreader of claim 1 wherein said first and second cylinders have transversely concave outer surface areas substantially at the outward extension of said first and second projections.

5. A hydraulic flange spreader which comprises a first piston having two ends, two opposing closed cylinders slidably positioned over the ends of said piston substantially in pressure sealed relation with said piston, flange spreader projections carried by said opposing cylinders and positionable in adjacent relation with each other, a second piston attached in sealed relation to said first piston between said slidable position cylinders and having its axis substantially perpendicular to the axis of said first piston, a pressurizable conduit within said first and second pistons and communicating externally from said first piston by outlets through the said two ends of said first piston and communicating externally from said second piston through an inlet means on the unattached end of said second piston, a hammerable cylindrical pressure cap slidably positioned on the unattached end of said second piston substantially in pressure sealed relation with said second piston and means for avoiding backing-off the pressure after each hammer blow on said cap.

References Cited in the file of this patent

UNITED STATES PATENTS

| | | |
|---|---|---|
| 436,915 | Fischer | Sept. 23, 1890 |
| 2,161,013 | Breza | June 6, 1939 |
| 2,393,795 | Miller | Jan. 29, 1946 |
| 2,407,471 | Burk | Sept. 10, 1946 |
| 2,439,692 | McKay | Apr. 13, 1948 |
| 2,587,893 | Pridy et al. | Mar. 4, 1952 |
| 2,674,034 | Stone | Apr. 6, 1954 |